(12) United States Patent
Nishio et al.

(10) Patent No.: US 6,984,669 B2
(45) Date of Patent: Jan. 10, 2006

(54) FLUORINATED CATION EXCHANGE MEMBRANE AND ELECTROLYTIC SODA PROCESS

(75) Inventors: Takuo Nishio, Kanagawa (JP); Yoshihiko Saito, Kanagawa (JP); Tetsuji Shimohira, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/703,443

(22) Filed: Nov. 10, 2003

(65) Prior Publication Data

US 2004/0092611 A1 May 13, 2004

Related U.S. Application Data

(63) Continuation of application No. PCT/JP02/05973, filed on Jun. 14, 2002.

(30) Foreign Application Priority Data

Jun. 15, 2001 (JP) .............................. 2001-181863

(51) Int. Cl.
*C08J 5/20* (2006.01)
(52) U.S. Cl. ............................ 521/27; 521/29; 521/31; 204/296; 205/344
(58) Field of Classification Search ................. 521/27, 521/29, 31; 204/296; 205/344
See application file for complete search history.

(56) References Cited

U.S. PATENT DOCUMENTS 4,544,471 A * 10/1985 Silva et al. .................. 204/252
4,587,274 A 5/1986 Nakahara et al.
4,626,553 A 12/1986 Hane et al.
5,716,504 A * 2/1998 Saito et al. .................. 204/296

FOREIGN PATENT DOCUMENTS

| EP | 0 045 603 | 2/1982 |
| EP | 0 192 261 | 8/1986 |
| JP | 5-125579 | 5/1993 |
| JP | 6-330369 | 11/1994 |
| JP | 2000-1794 | 1/2000 |

* cited by examiner

*Primary Examiner*—Tatyana Zalukaeva
(74) *Attorney, Agent, or Firm*—Oblon, Spivak, McClelland, Maier & Neustadt, P.C.

(57) ABSTRACT

The present invention provides a fluorinated cation exchange membrane comprising at least two layers, a first layer made of a fluoropolymer having sulfonic acid groups and a second layer made of a fluoropolymer having carboxylic acid groups on the cathode side thereof, wherein when an electrolytic soda process is conducted using the cation exchange membrane as a diaphragm between an anode compartment and a cathode compartment, the water transport number through the cation exchange membrane is at least 4.8 mol/F (F: Faraday) under operating conditions such that the brine concentration in the anode compartment is 200 g/L, the sodium hydroxide concentration in the cathode compartment is 32 mass %, the current density is 5 $kA/m^2$, and the temperature is 90° C. The fluorinated cation exchange membrane of the present invention gives an excellent effect such that a uniform catholyte concentration can be maintained even when installed in an electrolytic cell having no special circulating means.

6 Claims, 1 Drawing Sheet

FLUORINATED CATION EXCHANGE MEMBRANE AND ELECTROLYTIC SODA PROCESS

TECHNICAL FIELD

The present invention relates to a fluorinated cation exchange membrane and an electrolytic soda process.

BACKGROUND ART

A method for electrolyzing an alkali metal chloride by an ion exchange membrane method is known wherein an aqueous alkali metal chloride solution is electrolyzed by using a fluorinated cation exchange membrane as a diaphragm to produce an alkali metal hydroxide and chlorine. In order to maintain a good operation performance for a long time in an electrolytic soda process by an ion exchange membrane method, it is important to adjust and maintain the catholyte concentration in the cathode compartment within a prescribed range and uniformly.

A common method for adjusting the concentration is to supply water into the cathode compartment. However, this method has the following problem. Firstly, if the liquid circulation in the cathode compartment is inadequate, the catholyte concentration decreases in the vicinity where water is supplied, and inversely, the catholyte concentration tends to be high at a portion where dilution scarcely takes place. As a result, the current efficiency decreases. Further, if supply of water to the cathode compartment stops by some trouble, the catholyte concentration rapidly increases, and the current efficiency substantially decreases. In such a case, once the current efficiency decreases, it is difficult to return it to the initial level, and change of the membrane will be required.

Some means have been proposed to improve the liquid circulation in the cathode compartment in order to make the catholyte concentration uniform. They are, for example, a means wherein a conductive spacer is disposed between an electrode plate and an electrode sheet to form a down flow path for the electrolyte (JP-A-61-19789), a means having a cylindrical current distributing member attached to form a down flow path for the electrolyte (JP-A-63-11686), a means having a cylindrical internal circulation duct which will be a circulation flow path for the electrolyte (JP-A-4-289184), a means having an apparatus to uniformly distribute the electrolyte to anode and cathode compartments (JP-A-4-289185) and others (JP-A-4-289186, JP-A-4-350189, and JP-A-4-350190).

DISCLOSURE OF THE INVENTION

The present invention provides a fluorinated cation exchange membrane comprising at least two layers, a first layer made of a fluoropolymer having sulfonic acid groups and a second layer made of a fluoropolymer having carboxylic acid groups on the cathode side thereof, wherein when an electrolytic soda process is conducted using the cation exchange membrane as a diaphragm between an anode compartment and a cathode compartment, the water transport number through the cation exchange membrane is at least 4.8 mol/F (F: Faraday) under operating conditions such that the brine concentration in the anode compartment is 200 g/L, the sodium hydroxide concentration in the cathode compartment is 32 mass %, the current density is 5 kA/m$^2$, and the temperature is 90° C.

BRIEF DESCRIPTION OF THE DRAWINGS

In FIG. 1, the ordinate represents the intensity (arbitrary unit).

BEST MODE FOR CARRYING OUT THE INVENTION

Figure 1:
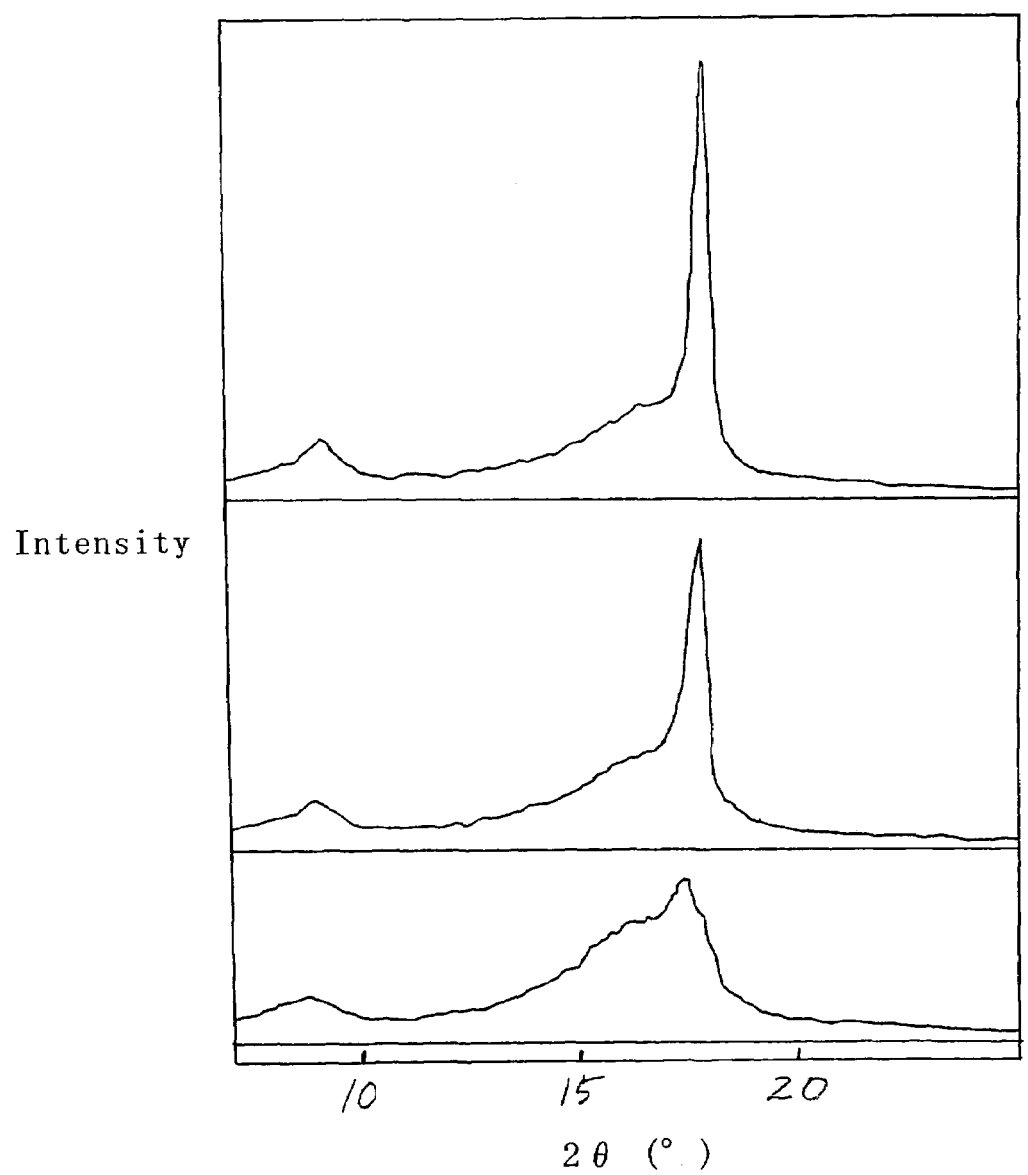
FIG. 1 shows examples of X-ray diffraction patterns of membranes.

In a case where the liquid circulation in the cathode compartment is inadequate, the catholyte concentration in the vicinity where water is supplied will be locally low, and inversely, the catholyte concentration at a portion where dilution scarcely takes place, will locally be high. As a result, the current efficiency will decrease.

The present invention has been made to solve the above problem, and it has been found possible to accomplish the object by employing a membrane having a large water transport number as a membrane capable of suppressing the amount of water supplied to the cathode compartment to the minimum level. Heretofore, it has been known that if the brine concentration is lowered, the water transport number will increase, but it is not desirable to reduce the brine concentration too low, since the current efficiency will decrease in a long time operation, or deterioration of the membrane will result. Further, it is also known that if the current density is increased, the water transport number will increase. However, it is not desirable to increase the current density too high, since the current efficiency will decrease in a long time operation, or deterioration of the membrane will result.

With the fluorinated cation exchange membrane in the present invention, the water transport number through the cation exchange membrane is required to be at least 4.8 mol/F under the above-mentioned operating conditions in the electrolytic soda process employing the cation exchange membrane as a diaphragm between the anode compartment and the cathode compartment. Hereinafter, the water transport number will be represented by a value measured under the above conditions. It is more preferred that the water transport number is at least 4.9 mol/F. If the water transport number is too large, the catholyte concentration is likely to decrease from the preferred range for the electrolysis. Accordingly, it is preferable at most 6.4 mol/F.

A usual optimum catholyte concentration in brine electrolysis by an ion exchange membrane method, is from 28 to 35 mass %, although it depends also on the construction of the membrane. This catholyte concentration is considered to be determined by the following factors. During the electrolysis, sodium ions will penetrate as hydrated ions from the anode side into the membrane and will be transported to the cathode side. Namely, they pass through the membrane as accompanied by water. The amount of penetrating sodium ions per unit time, depends on the electric current and the current efficiency. The cathode compartment is usually in a high temperature state of from 60 to 90° C., whereby water will evaporate. Usually, the amount of accompanying water (hereinafter referred to as the water transport number) is at a level of from 3 to 4.5 mol/F (18th Soda Industry Technical Discussion Meeting, summaries of reports, p. 90 (published by Electrolysis Chemical Technology Committee of Electrochemical Association in 1994)). The evaporation amount of water exceeds such a water transport number. Accordingly, in order to control the catholyte concentration to the optimum level, it is necessary to separately supply water to the cathode compartment.

The sodium hydroxide concentration in the catholyte is determined by a function of the electric current, the current efficiency, the water transport number, the water evaporation amount and the amount of water supplied to the cathode compartment and will be represented by the following formula.

$$\text{NaOH (mass \%)} = \frac{I \times CE \times 100}{I \times CE + 67 \times (W - V) + I \times (Tw - 1) \times 45}$$

I: electric current (A),
CE: current efficiency (%),
W: amount of water supplied (g/h),
V: water evaporation amount (g/h),
Tw: water transport number (mol/F).

The water transport number being 4.9 mol/F is the condition under which the sodium hydroxide concentration in the cathode compartment can be maintained at a level of 35 mass % without supplying water to the cathode compartment, although it may vary to some extent depending upon the amount of water evaporated from the catholyte. The water transport number being 6.4 mol/F is the condition under which the sodium hydroxide concentration in the cathode compartment can be maintained at a level of 28 mass % without supplying water to the cathode compartment.

The first layer to form the fluorinated cation exchange membrane is made of fluoropolymer having sulfonic acid groups. The first layer itself may be a laminate of two or more layers made of a fluoropolymer having sulfonic acid groups.

The second layer to form the fluorinated cation exchange membrane is preferably such that the crystallinity obtainable from the X-ray diffraction spectrum is from 18 to 22%. If the crystallinity of the second layer exceeds 22%, the water transport number may decrease, such being undesirable. If the crystallinity of the second layer is less than 18%, the current efficiency during the electrolysis may decrease, such being undesirable. Here, the crystallinity is one defined by the following formula based on the crystalline peak area (Ic) and the non-crystalline harrow area (Ia), obtained from the X-ray diffraction pattern with respect to a dried membrane wherein the counter ions to the ion exchange groups are Na ions.

$$Xc = (Ic/(Ic + 0.661 \times Ia)) \times 100$$

Three examples of X-ray diffraction patterns of membranes are shown in FIG. 1. As shown in the FIGURE, a peak in the vicinity of 18° (crystalline peak) attributable to the crystalline portion and a broad peak having an apex in the vicinity of 16° (non-crystalline harrow) attributable to the amorphous portion, are observed. Accordingly, on the basis that only these two types of peaks are present in the range of 2θ being from 11 to 24° in the diffraction pattern, the peak separation is carried out to obtain Ic and Ia. In FIG. 1, examples are given so that the crystallinity lowers from the top to down. Further, 0.661 in the formula is an empirically known constant.

The thickness of the second layer is preferably from 2 to 15 $\mu$m. If the thickness exceeds 15 $\mu$m, the water transport number may decrease, such being undesirable. If the thickness is less than 2 $\mu$m, the current efficiency may decrease in a long time operation, such being undesirable. A more preferred thickness of the second layer is from 4 to 12 $\mu$m.

As a membrane having a specific construction, a fluorinated cation exchange membrane comprising at least two layers, a first layer made of a fluoropolymer having sulfonic acid groups and a second layer made of a fluoropolymer having carboxylic acid groups on the cathode side thereof, wherein the second layer has a crystallinity of from 18 to 22% as obtained from the X-ray diffraction pattern, and a thickness of from 4 to 12 $\mu$m, has a high water transport number as compared with conventional membranes and thus provides an excellent effect such that even when it is installed in an electrolytic cell having no special liquid circulation means, a uniform catholyte concentration can be maintained.

The second layer is preferably a polymer film made of a copolymer of $CF_2=CFOCF_2CF_2CF_2CO_2CH_3$ or $CF_2=CFOCF_2CF_2CO_2CH_3$ which have relatively short side chains with at least one type of other monomers. If the second layer substantially contains long side chains or side chains having branched structures, for example, if it contains a substantial amount of a monomer such as $CF_2=CF(OCF_2CF(CF_3))_nOCF_2CF_2CO_2CH_3$ (n is at least 1), the crystallinity is likely to be low. Specifically, the second layer is preferably a copolymer of $CF_2=CFOCF_2CF_2CF_2CO_2CH_3$ with $CF_2=CF_2$.

The first layer to form the fluorinated cation exchange membrane, preferably has a water content of at least 24 mass %. If the water content is less than 24 mass %, the water transport number is likely to decrease, such being undesirable. The water content is more preferably at least 26 mass %, whereby the water transport number will be in a more preferred range. However, if the water content (W) becomes too high, the membrane strength tends to decrease, and the water content is preferably at most 44 mass %. The water content is obtained by the following formula, wherein W1 is the mass of a film made of an ion exchange resin constituting the first layer, as measured at room temperature, as withdrawn after immersing it in a 12 mass % sodium hydroxide aqueous solution for 16 hours, and W2 is the mass of the film as measured at room temperature, as withdrawn after vacuum drying the measured film at a temperature of 150° C. for 16 hours.

$$W = ((W_1 - W_2)/W_2) \times 100$$

The thickness of the first layer is preferably from 20 to 300 $\mu$m. If the thickness is less than 20 $\mu$m, the strength of the membrane tends to decrease, such being undesirable. If the thickness exceeds 300 $\mu$m, the resistance of the membrane tends to increase, such being undesirable. A preferred thickness of the first layer is from 30 to 100 $\mu$m.

The fluorinated cation exchange membrane of the present invention may be used as it is. However, it is preferred to apply treatment to release chlorine gas, to at least one surface of the cation exchange membrane, particularly preferably to at least the anode side surface of the cation exchange membrane, whereby the long term stability of the current efficiency can further be improved.

The method for applying the treatment to release the gas to the surface of the cation exchange membrane may, for example, be a method of imparting fine irregularities to the membrane surface (JP-B-60-26495), a method of supplying a liquid containing an iron compound, zirconium oxide, etc. to the electrolytic cell to deposit a gas-releasing covering layer containing hydrophilic inorganic particles on the membrane surface (JP-A-56-152980) or a method of forming a porous layer containing particles having gas and liquid permeability and no electrode activities (JP-A-56-75583 and JP-A-57-39185). The gas-releasing covering layer on the surface of the cation exchange membrane provides not only an effect to improve the long term stability of the current efficiency but also an effect whereby the voltage during the electrolysis can further be reduced.

The fluorinated cation exchange membrane of the present invention may be reinforced by e.g. woven fabric, non-woven fabric fibril or porous body made of a fluoropolymer such as polytetrafluoroethylene, as the case requires.

By using the fluorinated ion exchange membrane of the present invention as a diaphragm between an anode compartment and a cathode compartment, brine electrolysis can be carried out under a stabilized condition for a long period of time. In such a case, the electrolytic cell may be of a monopolar type or a bipolar type. With respect to the material to constitute the electrolytic cell, in the case of an anode compartment, a material resistant to the brine and chlorine, such as titanium, may be used, and in the case of a cathode compartment, stainless steel or nickel which is resistant to sodium hydroxide and hydrogen, may be used. When an electrode is installed in the present invention, a cathode may be disposed in contact with the ion exchange membrane or with a proper distance therefrom.

EXAMPLES

Example 1

Resin A made of a $CF_2=CF_2/CF_2=CFO(CF_2)_3CO_2CH_3$ copolymer and having an ion exchange capacity of 0.95 mmol/g and resin B made of a $CF_2=CF_2/CF_2=CFOCF_2CF(CF_3)OCF_2CF_2SO_2F$ copolymer and having an ion exchange capacity of 1.13 mmol/g were prepared. Then, resin A and resin B were subjected to coextrusion to obtain film A of a two layer structure comprising a layer of resin A having a thickness of 7 $\mu$m and a layer of resin B having a thickness of 65 $\mu$m. Further, resin B was subjected to melt-extrusion to obtain film B having a thickness of 22 $\mu$m.

On the other hand, monofilament PTFE yarns obtained by rapidly stretching a polytetrafluoroethylene (PTFE) film, followed by slitting into 100 denier, and multifilament PET yarns obtained by drawing and twisting six polyethylene terephthalate (PET) filaments of 5 denier, were subjected to plain weaving in an alternating arrangement of two PET yarns to one PEFE yarn, to obtain a reinforcing woven fabric having a yarn density of 30 yarns/cm. This woven fabric was flattened by a roll press so that the thickness of the woven fabric became about 80 $\mu$m.

The woven fabric and films thus obtained were overlaid in the order of from B, the woven fabric, film A (so that the layer of resin A would be on the releasing PET film side) and the releasing PET film (thickness: 100 $\mu$m) and laminated by means of heating rollers. Then, the releasing PET film was peeled to obtain a reinforced laminated membrane.

Then, a paste comprising 29.0 mass % of zirconium oxide having an average particle size of 1 $\mu$m, 1.3 mass % of methyl cellulose, 4.6 mass % of cyclohexanol, 1.5 mass % of cyclohexane and 63.6 mass % of water, was transferred by a roll press on the film B side of the laminated membrane to attach a gas-releasing covering layer. The attached amount of zirconium oxide at that time was 20 g/m².

Then, $CO_2CH_3$ groups and $SO_3F$ groups were hydrolyzed by immersion in an aqueous solution containing 30 mass % of dimethylsulfoxide and 15 mass % of potassium hydroxide. Then, the counter ions of the ion exchange groups were converted to Na ions by immersion in a 4 mass % aqueous solution of sodium hydrogen carbonate.

Further, a dispersion having 13 mass % of zirconium oxide having an average particle size of 5 $\mu$m dispersed in an ethanol solution containing 2.5 mass % of an acid-form polymer of resin B, was prepared, and this dispersion was sprayed to the film A side of the above laminated membrane to attach a gas-releasing covering layer. The attached amount of zirconium oxide at that time was 10 g/m².

Separately, resin A was formed into a film, subjected to the hydrolysis as described above, and the crystallinity was measured and found to be 19.3%. Likewise, resin B was formed into a film and subjected to hydrolysis as described above, and the water content was measured and found to be 31 mass %.

The fluorinated cation exchange membrane thus obtained, was disposed in an electrolytic cell so that film A faced the cathode, and electrolysis of a sodium chloride aqueous solution was carried out. For the electrolysis, an electrolytic cell (height: 5 cm, width: 30 cm) having an effective current-carrying area of 1.5 dm² was employed, wherein the inlet of water to be supplied to the cathode compartment was disposed at a lower part of the cathode compartment, and the outlet of the formed sodium hydroxide aqueous solution was disposed at an upper part of the cathode compartment, so that there would be a site where the catholyte would be hardly circulated within the cathode compartment frame. As the anode, one having a titanium punched metal (short diameter: 4 mm, long diameter: 8 mm) coated with a solid solution of ruthenium oxide, iridium oxide and titanium oxide, was used, and as the cathode, one having ruthenium-containing Raney Nickel electrically deposited on a SUS304 punched metal (short diameter: 5 mm, long diameter: 10 mm) was used.

Further, the electrolysis was carried out for one week by bringing the cathode side in a pressurized state so that the anode and the membrane would be in contact with each other, while supplying 290 g/L of an aqueous sodium chloride solution and water to the anode compartment and the cathode compartment, respectively, and maintaining the sodium chloride concentration discharged from the anode compartment to be 200 g/L and the sodium hydroxide concentration discharged from the cathode compartment to be 32 mass %, under such conditions that the temperature was 90° C. and the current density was 5 kA/m², whereby the current efficiency was 97.0%, and the water transport number was 5.0 mol/F.

Example 2

Using the membrane of Example 1 in the above electrolytic cell, electrolysis was carried out while supplying 290 g/L of an aqueous sodium chloride solution to the anode compartment and not supplying water to the cathode compartment, and maintaining the sodium chloride concentration discharged from the anode compartment to be 180 g/L under such conditions that the temperature was 90° C. and the current density was 6 kA/m², whereby the concentration of sodium hydroxide discharged from the cathode compartment was 32.8 mass %, the current efficiency was 96.5%, and the water transport number was 5.3 mol/F.

Examples 3 to 9

Using the same film-forming method and electrolysis conditions as disclosed in Example 1, electrolysis was carried out by changing only the ion exchange capacity and thickness of the layer of resin A of film A, and/or the ion exchange capacity of the layer of resin B of film A. Further, for film B, resin B having a thickness of 22 μm was employed. Among these Examples, Examples 6 to 9 are Comparative Examples. The ion exchange capacity is changed as the monomer ratio in the $CF_2=CF_2/CF_2=CFO(CF_2)_3CO_2CH_3$ copolymer or the $CF_2=CF_2/CF_2=CFOCF_2CF(CF_3)OCF_2CF_2SO_2F$ copolymer is changed. In any case, the ion exchange capacity decreases as the ratio of $CF_2=CF_2$ increases. The results are shown in Table 1. In Table 1, AR means the ion exchange capacity.

Using a $CF_2=CF_2/CF_2=CFOCF_2CF(CF_3)OCF_2CF_2CO_2CH_3$ copolymer having an ion exchange capacity of 0.94 meq/g as resin A for film A and a $CF_2=CF_2/CF_2CFOCF_2CF(CF_3)OCF_2CF_2SO_2F$ copolymer as resin B, electrolysis was carried out by using the film forming method and electrolysis conditions as disclosed in Example 1. The results are shown in Table 1.

TABLE 1

| Ex. No. | Layer of resin A in film A | | | Resin B | | Current efficiency (%) | Water transport number (mol/F) |
|---|---|---|---|---|---|---|---|
| | AR (mmol/g) | Film Thickness (μm) | Crystallinity (%) | AR (mmol/g) | Water content (mass %) | | |
| 1 | 0.95 | 7 | 19.3 | 1.13 | 31 | 97.0 | 5.0 |
| 2 | 0.95 | 7 | 19.3 | 1.13 | 31 | 96.5 | 5.3 |
| 3 | 0.95 | 4 | 19.3 | 1.13 | 31 | 97.0 | 5.1 |
| 4 | 0.95 | 7 | 19.3 | 1.10 | 28 | 97.0 | 4.9 |
| 5 | 0.90 | 7 | 21.0 | 1.13 | 31 | 96.2 | 4.9 |
| 6 | 1.00 | 7 | 17.7 | 1.13 | 31 | 89.0 | 4.4 |
| 7 | 0.85 | 7 | 22.7 | 1.13 | 31 | 94.4 | 4.6 |
| 8 | 0.95 | 20 | 19.3 | 1.13 | 31 | 88.4 | 3.8 |
| 9 | 0.95 | 7 | 19.3 | 0.95 | 18 | 92.9 | 4.4 |
| 10 | 0.94 | 7 | 15.5 | 1.10 | 28 | 91.5 | 4.5 |

Examples 6 and 10 are Examples in which a cation exchange membrane was employed wherein the crystallinity of film A was low, and the water transport number was less than 4.8 mol/F. Example 7 is an Example wherein a cation exchange membrane was employed wherein the crystallinity of film A was high, and consequently, the water transport number of the cation exchange membrane was less than 4.8 mol/F. Example 8 is an Example wherein a cation exchange membrane was used wherein the thickness of film A was thick, and the water transport number of the cation exchange membrane was less than 4.8 mol/F. Example 9 is an Example wherein a cation exchange membrane was employed wherein the water content of film B was low, and the water transport number was less than 4.8 mol/F. In Examples 6 to 9, the catholyte concentration at a portion hardly diluted by water supplied, became locally high, and the current efficiency decreased.

INDUSTRIAL APPLICABILITY

The fluorinated cation exchange membrane for electrolysis of the present invention provides an excellent effect such that even when it is installed in an electrolytic cell having no special liquid-circulation means, a uniform catholyte concentration can be maintained. Particularly, an operation is possible even when supply of water is stopped, whereby it is possible to eliminate incidental facilities such as a purification apparatus for water, piping to the electrolytic cell, a valve for adjustment, a flow rate meter, a means to uniformly disperse the catholyte in the cathode compartment, etc. Further, the decomposition rate of the brine can be increased, whereby the amount of the raw material salt can be reduced.

The entire disclosure of Japanese Patent Application No. 2001-181863 filed on Jun. 15, 2001 including specification, claims, drawings and summary is incorporated herein by reference in its entirety.

What is claimed is:

1. A fluorinated cation exchange membrane comprising at least two layers, a first layer made of a fluoropolymer having sulfonic acid groups and a second layer made of a fluoropolymer having carboxylic acid groups on the cathode side thereof, wherein when an electrolytic soda process is conducted using the cation exchange membrane as a diaphragm between an anode compartment and a cathode compartment, the water transport number through the cation exchange membrane is at least 4.8 mol/F (F: Faraday) under operating conditions such that the brine concentration in the anode compartment is 200 g/L, the sodium hydroxide concentration in the cathode compartment is 32 mass %, the current density is 5 kA/m2, and the temperature is 90° C. wherein said second layer made of a fluoropolymer having carboxylic acid groups has a thickness of from 2 to 15 μm.

2. The fluorinated cation exchange membrane according to claim 1, wherein the second layer has a crystallinity of from 18 to 22% as obtained from the X-ray diffraction pattern.

3. The fluorinated cation exchange membrane according to claim 1, wherein the water transport number through the cation exchange membrane is from 4.9 to 6.4 mol/F.

4. The fluorinated cation exchange membrane according to claim 1, wherein the first layer has a water content of at least 24 mass % in a 12 mass % sodium hydroxide aqueous solution at 90° C., and a thickness of from 20 to 300 μm.

5. An electrolytic soda process characterized in that the fluorinated cation exchange membrane as defined in claim 1 is used as a diaphragm between an anode compartment and a cathode compartment.

6. An electrolytic soda process characterized in that the fluorinated cation exchange membrane as defined in claim 1 is used as a diaphragm between an anode compartment and a cathode compartment.

* * * * *